United States Patent
Stadler

(10) Patent No.: US 9,664,522 B2
(45) Date of Patent: May 30, 2017

(54) METHOD AND NAVIGATION DEVICE FOR PROVIDING INFORMATION RELATING TO A PARKING SPACE

(71) Applicant: AUDI AG, Ingolstadt (DE)

(72) Inventor: Michael Stadler, Arnsberg (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/763,624

(22) PCT Filed: Jan. 24, 2014

(86) PCT No.: PCT/EP2014/000182
§ 371 (c)(1),
(2) Date: Jul. 27, 2015

(87) PCT Pub. No.: WO2014/114456
PCT Pub. Date: Jul. 31, 2014

(65) Prior Publication Data
US 2015/0369613 A1   Dec. 24, 2015

(30) Foreign Application Priority Data

Jan. 26, 2013 (DE) .................. 10 2013 001 308

(51) Int. Cl.
*G01C 21/26* (2006.01)
*G01C 21/32* (2006.01)
(Continued)

(52) U.S. Cl.
CPC ............. *G01C 21/26* (2013.01); *B60R 1/00* (2013.01); *G01C 21/32* (2013.01); *G01C 21/3685* (2013.01); *B60R 2300/806* (2013.01)

(58) Field of Classification Search
CPC .... G01C 21/26; G01C 21/32; G01C 21/3685; B60R 1/00; B60R 2300/806
See application file for complete search history.

(56) References Cited

U.S. PATENT DOCUMENTS 6,266,609 B1   7/2001   Fastenrath
6,816,085 B1   11/2004   Haynes et al.
(Continued)

FOREIGN PATENT DOCUMENTS

CN   102622871   8/2012
DE   102009012435   1/2010
(Continued)

OTHER PUBLICATIONS

WIPO English Language Translation of the International Preliminary Report on Patentability for PCT/EP2014/000182, mailed Aug. 13, 2015, 7 pages.
(Continued)

*Primary Examiner* — Adam Tissot
*Assistant Examiner* — Tamara Weber
(74) *Attorney, Agent, or Firm* — Staas & Halsey LLP

(57) ABSTRACT

A method provides information relating to a parking space. Reliable information is transmitted relative to one or more parking spaces, to provide the information to a driver of a vehicle. A detection device detects feature-related data of a parking space which describe an environmental influence to which a first vehicle parked in the parking space was exposed, and/or which describe an event that has taken place in the parking space and/or that describe a geographical location of the parking space. The feature-related data are stored by an information unit outside the vehicle. An information device then transmits the feature-related data to a navigation device by which the driver of a second vehicle searches for a parking space for the second vehicle.

21 Claims, 1 Drawing Sheet

(51) Int. Cl.
*G01C 21/36* (2006.01)
*B60R 1/00* (2006.01)

(56) References Cited

U.S. PATENT DOCUMENTS

| | | | |
|---|---|---|---|
| 7,123,166 B1* | 10/2006 | Haynes | G08G 1/14 340/932.2 |
| 7,538,690 B1* | 5/2009 | Kaplan | G01C 21/20 340/932.2 |
| 8,134,479 B2 | 3/2012 | Suhr et al. | |
| 8,589,065 B2* | 11/2013 | Scofield | G01C 21/3605 340/932.2 |
| 2006/0152349 A1* | 7/2006 | Ratnakar | G07B 15/00 340/426.1 |
| 2010/0253540 A1* | 10/2010 | Seder | B60R 1/00 340/905 |
| 2011/0208646 A1* | 8/2011 | McMaster | G06Q 30/02 705/39 |
| 2012/0062395 A1 | 3/2012 | Sonnabend et al. | |
| 2012/0200430 A1* | 8/2012 | Spahl | G01C 21/3685 340/932.2 |
| 2012/0262305 A1 | 10/2012 | Woodard et al. | |

FOREIGN PATENT DOCUMENTS

| | | |
|---|---|---|
| DE | 102009027543 | 1/2011 |
| DE | 102009028024 | 2/2011 |
| DE | 10 2013 001 308.9 | 1/2013 |
| EP | 1006503 | 6/2000 |
| KR | 10-2009-0055988 | 6/2009 |
| WO | 2010/081547 | 7/2010 |
| WO | 2011/138035 | 11/2011 |
| WO | 2012/019628 | 2/2012 |
| WO | EP2014/000182 | 1/2014 |

OTHER PUBLICATIONS

German Office Action for German Priority Patent Application No. 10 2013 001 308.9, issued Nov. 15, 2013, 8 pages.
English Language International Search Report for PCT/EP2014/000182, mailed on May 8, 2014, 3 pages.
Chinese Office Action issued on Nov. 30, 2016 in corresponding Chinese Patent Application No. 201480006012.3.

* cited by examiner

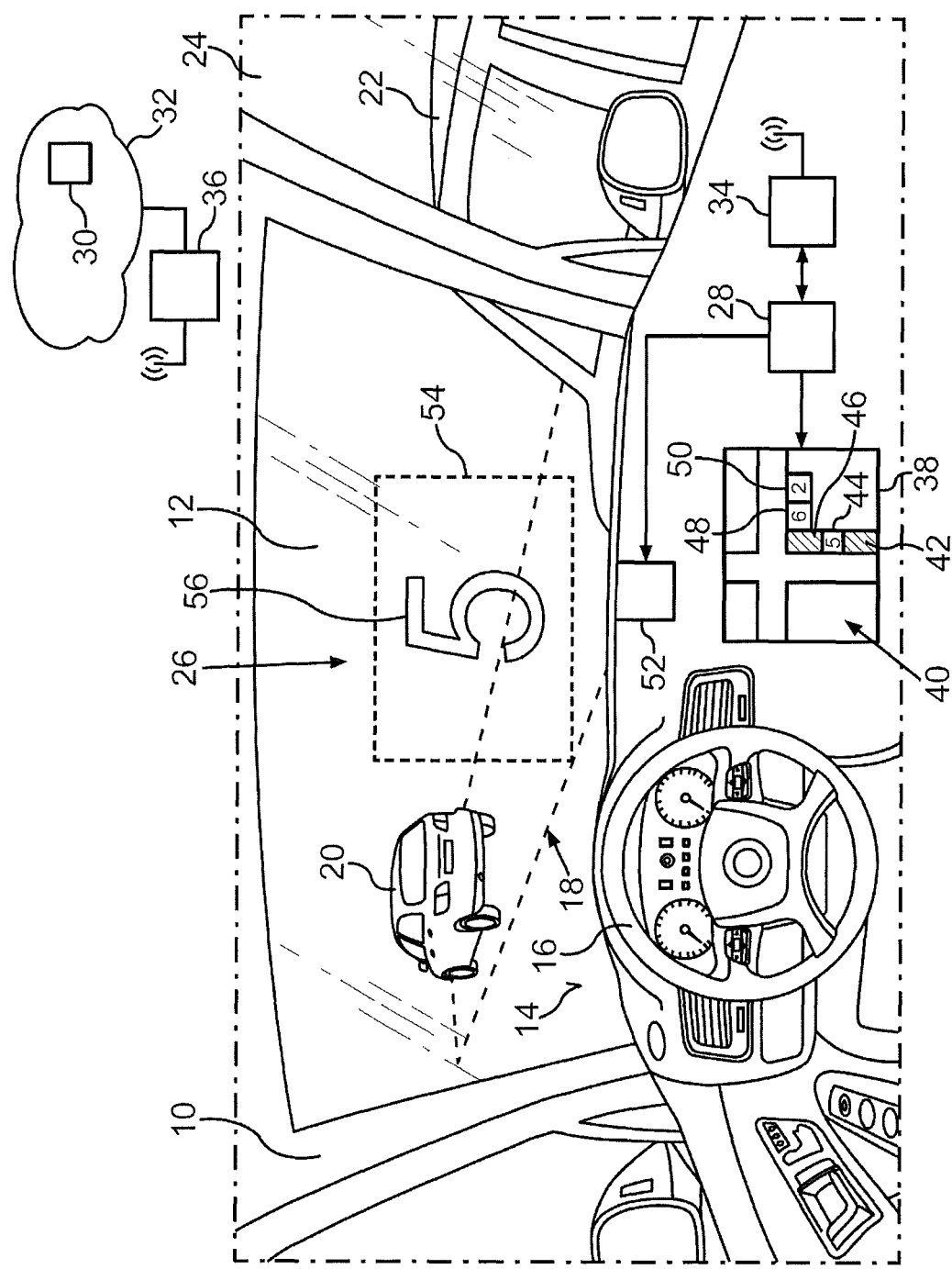

METHOD AND NAVIGATION DEVICE FOR PROVIDING INFORMATION RELATING TO A PARKING SPACE

CROSS REFERENCE TO RELATED APPLICATIONS

This application is based on and hereby claims priority to International Application No. PCT/EP2014/000182 filed on Jan. 24, 2014 and German Application No. 10 2013 001 308.9 filed on Jan. 26, 2013, the contents of which are hereby incorporated by reference.

BACKGROUND

The invention relates to a method for providing information about a parking spot. The invention also includes a navigation apparatus that is used to make this information available to a driver of a motor vehicle, and a motor vehicle that has a corresponding navigation apparatus.

A method for providing information about a parking spot is already known from DE 10 2009 027 543 A1. The method described in this document involves computation of the shading of a parking spot by an adjacent building from a prescribed position of the sun. This involves the use of a trigonometric formula or a ray tracing method. The shadow profile over the course of the day is then obtained from the juxtaposition of shadowing at various times of day.

A disadvantage of this method is that a very large amount of information needs to be known about the silhouettes of the buildings around a parking spot in order to be able to compute a reliable estimate of the shadowing. In addition, conditions that vary with the season, such as the shadow that is thrown by trees with their foliage, can be taken into account only with difficulty.

SUMMARY

One possible object is conveying reliable information about each of one or more parking spots and providing the information for a driver of a vehicle.

The inventor proposes a method that allows empirical feature data to be used to ascertain a reliable statement about whether a parking spot is suitable for a vehicle when a driver wishes to leave the vehicle in the parking spot at a particular time. To this end, the method involves these feature data for the parking spot initially being captured by a capture device. There is a great deal of flexibility for this, i.e. the feature data can describe very different features or properties of a parking spot. By way of example, provision may thus be made for the feature data to describe an environmental influence that has affected at least one vehicle previously parked in the parking spot, that is to say insolation or else hoar frost, for example. Alternatively, the feature data may be data pertaining to an event that occurs at the parking spot. By way of example, in this case it is possible for the feature data to specify whether vandalism has already occurred in the vicinity of the parking spot. Alternatively, the feature data can describe a geographical position of the parking spot, that is to say whether the parking spot is covered, for example. Depending on the type of the feature data, the capture device then needs to be provided with appropriate technical configuration.

On the basis of the proposed method, the feature data captured by the capture device are stored by a vehicle-external information device, that is to say a central database, for example, which may be e.g. part of a server on the internet. The information device thus stores the feature data from a large number of parking spots, said feature data being captured by a multiplicity of capture devices and transmitted to the information device. The feature data are then transmitted by the information device to a navigation device, as may be used by a driver of a particular vehicle to look for a parking spot for his vehicle. Such a navigation apparatus may be e.g. a mobile navigation appliance, a smartphone or a navigation or infotainment system of the vehicle itself. Alternatively, the navigation apparatus may be, by way of example, an arrangement comprising a plurality of intercommunicating appliances, for example an infotainment system or a navigation appliance in a vehicle and also a vehicle-external server that is connected to the navigation appliance or the infotainment system via an internet connection, for example.

The proposed method has the advantage that, when looking for a parking spot, the driver now has empirical feature data available for parking spots that he himself can use to decide whether a particular parking spot that is currently free and is in proximity to the vehicle is also suitable for parking. By way of example, if the feature data reveal that in half an hour the insolation on this parking spot will be very intensive, then this can possibly prevent the driver from selecting this parking spot, since otherwise his vehicle will heat up too much. Particularly if corresponding feature data are captured for a plurality of parking spots and stored by the information device and made available to the navigation apparatus, the driver can use the feature data to select which parking spot is best suited to him. The driver can then thus prioritize. Another embodiment of the method from relieves the driver of this decision. In this case, in an automated form, the navigation apparatus itself selects the best parking spot and stipulates it as a navigation destination.

In one embodiment of the method, the feature data additionally comprise a time statement, particularly a season and/or a time of day. If the feature data then describe a particular environmental influence that affected a vehicle in this parking spot previously, the time statement can be used by the driver or the navigation apparatus to appraise whether this environmental influence can also be expected at present if the vehicle is left in the parking spot. By way of example, insolation can be expected in a parking spot under deciduous trees only in winter when the trees have shed their foliage. In summer, the parking spot is shady. If the feature data describe an event, the time statement can likewise be used to estimate whether this event will be repeated again while the driver likewise leaves his vehicle in the parking spot. If, to date, a vehicle in the parking spot has been damaged only at night, for example, then a driver can probably leave his vehicle there without hesitation for five minutes if this occurs during the day.

In connection with the capture of an environmental influence, expedient embodiments of the method are obtained not only for the described capture of insolation but also through the capture of the following environmental influences: a degree of icing on an exterior surface of the vehicle can be captured, that is to say a measure of the degree to which a windshield of the vehicle is covered with ice in winter. In connection with the capture of a particular event, one embodiment of the method provides for capture of how well frequented is the road on which the parking spot is located. A further, significant event is when the parking spot was available. It may likewise be important to know whether the parking spot is lit at night. In connection with the capture of a geographical position, an advantageous embodiment of the method is obtained that involves capturing whether the parking spot is covered. An important piece of information is likewise the length of a footpath to a predetermined location that is within walking distance of the parking spot. Thus, if someone wishes to attend an event, for example, such as a theater performance, it may be of interest to him to learn how far it is necessary to walk from a parking spot to the event location.

As already explained, the capture device can be implemented in many different ways. By way of example, a plurality of embodiments of the method are obtained by virtue of the capture device comprising one or more of the following devices of one or more predecessor vehicles that were parked in the parking spot previously. For such a predecessor vehicle, it is possible to use a photosensor system, a thermometer, a humidity measuring device and/or a camera in order to also measure the insolation or the icing on windows. By way of example, it is possible for the latter to be ascertained in a manner formed from a combination of measured values for a temperature value, a humidity measurement and a camera picture. A further embodiment of the method provides for a navigation device of a predecessor vehicle to be used to ascertain empty runs when looking for a vehicle. If, by way of example, the navigation device identifies that the driver drives past a plurality of parking spots repeatedly and in so doing repeatedly passes these parking spots ("driving around the block"), this is evidently an empty run. For all of these parking spots, the navigation apparatus can then record that they were each evidently occupied at a particular time of day. In connection with the degree of icing and also in connection with heating of the vehicle interior by insolation, it is possible to provide an observation device for measuring the time that a driver of a predecessor vehicle needed in order to prepare for a journey after parking in the parking spot: thus, if a driver of the predecessor vehicle has to unlock and then first of all scrape ice from the windshield so as then to be able to drive off, it is possible to infer from the interval of time between unlocking and driving off that the driver evidently first of all had to prepare the vehicle for the journey because it was icy. By way of example, such an observer device may be provided in the form of a program module of an infotainment system and also may be configured to ascertain whether a predecessor vehicle was snow-covered, was covered with foliage, the windows were dirty or the vehicle interior was so hot that ventilation was first of all necessary.

Besides the described sensor capture of the feature data, further embodiments of the method provide for it to be possible to resort to already conditioned information. In this case, one embodiment of the method provides for an input apparatus to be used to receive, from a driver of a predecessor vehicle that had been parked in a particular parking spot, input data that the driver uses to provide a rating for the parking spot, that is to say, by way of example, the observation: "The motor vehicle was in blazing sun." This rating is normally more significant than a feature ascertained by sensor data. Another embodiment of the method accesses historical data about events relating to vandalism in the parking spot, which data are stored in a database. A further embodiment of the method provides for the reception of event data from a database about imminent events within a predetermined radius of the parking spot. By way of example, this makes it possible to predict for a parking spot whether a lot of football fans will pass by that evening because a football match will be held nearby. This can be an indication that a particularly large amount of mess may be expected as result of discarded trash.

As already explained, the information device may be a database. This is then used to store the feature data from each parking spot under an appropriate identification number for the respective parking spot. This allows systematic access to the feature data for a particular parking spot.

Whether particular feature data are relevant to a driver of a vehicle is, in particular, also dependent on when he wishes to leave his vehicle in the parking spot. If he wishes to park overnight, for example, then statements about insolation are irrelevant. In order to obtain an efficient compilation of information for a particular parking spot in this case, one embodiment of the method provides for the navigation apparatus to receive an input with time statement data from a driver who is looking for a parking spot for his vehicle, i.e. the driver uses a keypad or voice control, for example, to specify the probable parking period, that is to say from when to when. These time statement data indicate the period of time for which the vehicle will probably be parked in the parking spot and allow specific compilation of significant feature data for the parking spots in question.

As likewise already explained, respective feature data are preferably stored for a plurality of parking spots by the information device. So as now to make it easier for a driver to decide on a parking spot, the respective navigation apparatus preferably ascertains, for each parking spot, a rating for how well suited the respective parking spot is to parking his vehicle. In connection with the proposals, such a rating is intended to be understood to mean an association of a value or of a feature with each parking spot, so that a prioritization or order of rank between the parking spots is obtained. By way of example, it is thus possible to ascertain marks for the individual parking spots or else recommendations. Alternatively, it is possible, by way of example, to display the probable passenger space temperature that could arise as a result of insolation, or an indication of the probable length of time for preparing for driving after having parked in the parking spot, for example because ice needs to be scraped from the windshield. The rating has the advantage that the driver does not need to concern himself with details contained in the feature data themselves. The rating summarizes all feature data.

The reason is that the feature data themselves can describe particularly also a plurality of aspects of a parking spot. Each of these aspects is subsequently referred to as what is known as a parameter of the parking spot. In other words, the feature data from each parking spot can each comprise a plurality of parameters for a parking spot. Not every parameter then has the same relevance for every vehicle. If a vehicle has an independent vehicle heater, for example, then the risk of icing is very low and this parameter is therefore taken into account only in extreme cases when assessing a parking spot, e.g. when particularly low temperatures can be expected. Accordingly, one embodiment of the method provides for the navigation apparatus to ascertain the rating for each parking spot by applying to each of the parameters a weighting that can be set for each parameter and then combining the weighted parameters to produce the rating for the respective parking spot. This results in the advantage that for each vehicle the respective driver is individually provided with suitable ratings for the parking spots according to his needs.

Weather information can also play a significant part if an order of rank between the parking spots needs to be established, that is to say the parking spots need to be rated, according to the criteria of insolation or degree of icing. Thus, for an expected outside temperature above the 0° limit, sudden icing of the vehicle is rather unlikely. Similarly, insolation is more welcome in winter, since this heats up the vehicle in a comfortable and ecological manner. In this regard, one embodiment of the method provides for the rating for a parking spot to be ascertained by the navigation apparatus on the basis of weather data and/or a season and/or an outside temperature and/or a level of equipment of the vehicle that is looking (for example independent vehicle heater yes or no).

On the basis of the ratings ascertained for the individual parking spots, the driver can now be assisted during a search for a parking spot for his vehicle by virtue of the navigation apparatus displaying the appropriate rating for each parking spot to the driver. According to one embodiment of the method, this is accomplished by a navigation appliance or infotainment system of the vehicle that displays the parking spots with the relevant ratings in a street map or a road map. Another embodiment of the method provides for a projection apparatus to display the ratings to the driver of the vehicle using a windowpane. Thus, when looking out of the vehicle, the driver then has the rating directly for the individual parking spots in his field of vision. By way of example, the rating can be shown by a head up display unit that is known per se or else by virtue of specific decoupling of light from the windowpane, in which case the light accordingly needs to be coupled in at one edge of the windowpane. In this case, the windowpane is thus used as an optical fiber.

The ascertained rating can also be processed further in an automated form. Thus, according to one embodiment of the method, the navigation apparatus can select a parking spot in a predetermined environment around a prescribed navigation destination on the basis of the feature data received from the information device and can thus ascertain a navigation route to the selected parking spot. In this context "on the basis" means that the feature data or a rating derived therefrom is/are used directly for searching. The ascertainment of the navigation route to the selected parking spot advantageously navigates the driver not to his actual destination but rather straight to a suitable parking spot in proximity to the destination.

In order to advantageously provide the driver with control over the choice of parking spot in this case, one development of the method provides for the navigation device to receive from the driver or another user an appropriate input concerning the minimum requirement criterion that a parking spot needs to satisfy in order to be considered during selection of the possible parking spots.

The inventor also proposes a navigation apparatus, there are basically two embodiments that can also be combined with one another. As already explained, the navigation apparatus receives feature data pertaining to a plurality of parking spots from an information device, for example a central database server. The navigation apparatus may then firstly be designed to display, for each parking spot, the feature data and/or a rating derived therefrom for the parking spot in a map and/or by a projection apparatus using a windowpane of a motor vehicle. Additionally or alternatively, the navigation apparatus may also have provision for a parking spot to be selected in a predetermined environment around a prescribed navigation destination on the basis of the received feature data using a navigation database and for a navigation route to the selected parking spot to be ascertained.

The proposed navigation apparatus also includes developments that have features that have already been described in connection with the corresponding developments of the method. For this reason, the corresponding developments of the navigation apparatus are not described again at this juncture.

The inventor further proposes a motor vehicle, that is distinguished in that it has an embodiment of the navigation apparatus. Additionally or alternatively, the motor vehicle can also have an embodiment of the capture device described that can be used to capture feature data for a parking spot in which the parking spot is parked and/or was parked. This embodiment of the motor vehicle has the advantage that it can be used to accumulate feature data for different parking spots.

The proposals are explained again below more precisely with the aid of a specific exemplary embodiment. In the exemplary embodiments, the described components of the embodiments of the method are each individual features that can be considered independently of one another and that each also develop the proposals independently of one another and hence can also be regarded individually or in a different combination than that shown. Furthermore, the described embodiments can also be augmented by further instances of the features that have already been described.

BRIEF DESCRIPTION OF THE DRAWING

These and other objects and advantages of the present invention will become more apparent and more readily appreciated from the following description of the preferred embodiments, taken in conjunction with the accompanying drawing of which:

The single FIGURE shows a view through a windshield 12, from a perspective of a driver of a motor vehicle 10, onto a road 14 ahead of the motor vehicle 10. By way of example, the motor vehicle 10 may be an automobile. The motor vehicle 10 is a preferred embodiment of the motor vehicle. For the driver, the FIGURE shows the hands of the driver on a steering wheel 16. A plurality of vehicles 20, 22 are parked at the roadside 18 of the road 14. The vehicle 22 is partially visible through a side window 24 of the motor vehicle 10. Between the vehicles 20, 22, at the roadside 18, there is a parking space 26 that is a possible parking spot for the motor vehicle 10.

DETAILED DESCRIPTION OF THE PREFERRED EMBODIMENT

Reference will now be made in detail to the preferred embodiments of the present invention, examples of which are illustrated in the accompanying drawing, wherein like reference numerals refer to like elements throughout.

The driver of the motor vehicle 10 is looking for a parking spot and has accordingly activated a search mode in a navigation apparatus 28 of the motor vehicle 10. The navigation apparatus 28 has then requested feature data pertaining to suitable parking spots in the environment of the current position of the motor vehicle 10 from a server 30 on the internet 32 and has received said data from the server 30. The communication link between the navigation apparatus 28 and the server 30 is provided by a mobile radio module 34 of the motor vehicle 10. By way of example, the mobile radio module 34 may be a UMTS module, an LTE module or a GSM module. Using the communication module 34, the navigation apparatus 28 interchanges communication data with a mobile radio network 36 that is coupled to the internet 32.

The server 30 may be a single computer or an arrangement comprising a plurality of computers. The server 30 is an information device for storing feature data pertaining to parking spots. The navigation apparatus 28 may be set up to display on a screen 38 of the motor vehicle 10, for example a screen of an infotainment system, a road map 40 on which the possible parking spots for which feature data have been received to display. In the example shown, a total of 5 parking spots 42, 44, 46, 48, 50 are marked on the road map 40. The parking space 26 corresponds to the parking spot 44. A locating device (not shown) of the motor vehicle 10, for example a radar sensor or an ultrasonic sensor, may have been used by the navigation apparatus 28 to identify that the parking spots 42 and 46 are occupied by the vehicles 22 and 20, respectively. Behind a street corner, outside the field of vision of the driver, there are further parking spots 48, 50. Whether these are occupied cannot be measured by the navigation apparatus 28, however. In the present example, the navigation apparatus 28 displays such a rating in the form of a mark in the road map 40 for each potentially available parking spot 44, 48, 50. The mark may either have been received directly from the server 30 for each parking spot 44, 48, 50 or may have been computed by the navigation apparatus 28 from the feature data received from the server 30.

The navigation apparatus 28 may additionally be designed to actuate a head-up display unit 52 of the motor vehicle 10. By virtue of the control signals from the navigation apparatus 28, the head-up display unit 52 identifies the parking space 26 on the windshield 12 by a marker 54. By way of example, the marker 54 may be a frame that frames the parking space 26 from the perspective of the driver. A color for the marker 54 may be stipulated on the basis of the mark for the parking spot. In addition or as an alternative to the marker 54, it is furthermore possible for the mark to be displayed as appropriate symbol 56 on the windshield 12 by the head-up display unit 52. In the present example, the mark is formed by a number, with a larger number specifying better suitability of the parking spot for parking the motor vehicle 10.

The display of the rating, that is to say in this case the mark, makes it very much easier for the driver of the motor vehicle 10 to find a suitable parking spot. In summer, he can see from the ratings whether the vehicle will be in shade during the parking time, which means that he does not need to especially switch on the air-conditioning system after returning to the motor vehicle 10 in order to cool down the motor vehicle 10 again. In winter, the rating indicates to him whether the parking spot can be expected to have snow collecting on the windshield 12 and freezing over thereon during parking, which means that he would need to scrape ice next morning. For the ratings, the navigation apparatus 28 or the server 30 uses information pertaining to parking spots that allow the rating to be used to perform prioritization for the parking spot search. The prioritization can also be performed in automated fashion by the motor vehicle 10 by virtue of the navigation apparatus 28 taking the driver directly to the most suitable parking spot.

The rating on the basis of insolation can be made possible on the basis of feature data pertaining to the respective parking spots, said data being captured by vehicles parked in said parking spots previously. By way of example, what is known as data logging, that is to say concomitant writing of measured values, can be performed for other vehicles and this allows ascertainment of what insolation is captured at the parking spot by photosensor systems or temperature sensors, for example. These data are then transmitted to the database of the server 30 as feature data, each parking spot being able to be defined explicitly by an identification number. A degree of icing on a vehicle in winter can also be ascertained or estimated by vehicles that have parked in a particular parking spot previously. By way of example, an estimation is/are made possible by a humidity measurement in combination with a temperature measurement and the taking of a camera picture and also a time measurement pertaining to the time the driver requires when scraping. Alternatively, it is possible for such ratings (e.g. insolation and degree of icing) to be left to be made by the driver of the respective vehicles himself. In this case, the driver can be asked to forward the information, for example via his navigation appliance or his infotainment system, or he can also provide the rating independently himself. Further possible parameters for parking spots that can be used for the rating are as follows: it is possible to take account of the fact whether or not a parking spot is covered. It is also possible to detect whether the parking spot is in a well-frequented road. This may be beneficial insofar as thieves struggle more when they are observed. By contrast, a parking spot in a well-frequented road is rather unattractive if the road is what is known as a party road along which normally drunken people rowdily move along the parked vehicles. If it is not possible to look online, that is to say using an internet browser on the internet, for example, for whether the parking spot is free, it may be advantageous to know whether or not everything is at least often or less often blocked in at a particular parking spot. The availability of a parking spot too, i.e. an indication of how often the parking spot is occupied, may therefore be a parameter for rating a parking spot. One possible implementation for detecting availability involves the navigation appliances of vehicles reporting empty runs by said vehicles to the server 30 and an analysis of frequency being performed on the basis thereof. A further parameter is an estimated footpath to an actual destination of a trip if this is input into a navigation appliance of a motor vehicle or is automatically identified by a vehicle, as may be the case for a journey home, for example.

The feature data from the individual vehicles, which may then comprise one or more of said parameters or else further parameters, can be combined with the information concerning when the parking spot will probably be driven away from again, that is to say when the driver wishes to drive away the motor vehicle 10 again. This results in further opportunities for rating the parking spots. By way of example, insolation is no longer as crucial if the motor vehicle is not driven away again until evening. If parking is only for a short time, for example in order to go to a shop and purchase a product, the degree of icing is not a crucial parameter for rating in winter, for example. Weather information can also play a crucial part if prioritization is intended to take place on the basis of the criteria of insolation/degree of icing. The feature data can then be used to prioritize the parking spots as appropriate, i.e. to set up an order of rank for which parking spot is best suited or less suited to leaving the motor vehicle 10. The parameters that are known for each parking spot can also be weighted differently in this case, this being able to be prescribed by the driver using the navigation apparatus 28, for example. By way of example, the driver can prescribe the following weighting: insolation: very important, icing: not so important (for example because an independent vehicle heater may be installed in the motor vehicle 10), vehicles subject to riot: very important. By way of example, the latter piece of information can be ascertained via a further database, for example the police, from the internet, so as to learn from the database whether damage to vehicles has been reported from time to time at the location of the parking spot.

The parking spots can then be selected from the stipulations for the weighting. By way of example, the described marks for the parking spots can be displayed directly in the windshield 12. The driver can then decide on the parking spot in which he wishes to park the motor vehicle 10. Instead of the marks, it is also possible, by way of example, to display to the driver how long he needs to schedule in the morning for deicing his vehicle in winter after leaving the motor vehicle overnight in winter.

The examples show how the ascertainment of information pertaining to individual parking spots can increase comfort for a driver when using a motor vehicle. In addition, advantages arise as a result of lower fuel consumption, for example because independent vehicle heater times can be minimized or the cooling effort can be reduced.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV*, 69 USPQ2d 1865 (Fed. Cir. 2004).

The invention claimed is:

1. A method for providing information about a parking spot, comprising:
    capturing, by a capture device of a first vehicle, feature data for the parking spot, the feature data comprising:
        data that describe an environmental influence to which the first vehicle parked in the parking spot was exposed, the environmental influence being at least one of insolation on the first vehicle and a degree of icing on an exterior surface of the first vehicle; and
        a time statement concerning when the first vehicle was exposed to the environmental influence;
    storing, by a vehicle-external information device, the feature data;
    receiving a time statement input that indicates when a driver of a second vehicle wishes to park the second vehicle, the time statement input being received at a navigation apparatus used by the driver of the second vehicle to look for parking for the second vehicle;
    transmitting the feature data, by the information device, the feature data being transmitted to the navigation apparatus;
    checking, by the navigation apparatus, which feature data, including the feature data captured by the first vehicle, are relevant to the driver of the second vehicle, the feature data being checked for relevance to the driver of the second vehicle based on when the driver of the second vehicle wishes to park the second vehicle; and
    using the feature data relevant to the driver of the second vehicle, to compile, by the navigation apparatus, significant feature data, the significant feature data being compiled for a plurality of potential parking spots, including the parking spot of the first vehicle, wherein the time statement for the feature data and the time statement received at the navigation apparatus comprise at least one of a season and a time of day.

2. The method as claimed in claim 1, wherein for capturing the feature data, the capture device includes at least one device of the first vehicle selected from the group consisting of a photosensor system, a thermometer, a humidity measuring device, a camera, a navigation device which records empty runs when looking for a parking spot, and an observation device for measuring how much time was required for a driver of the first vehicle to prepare the first vehicle for a journey after being parked in the parking spot.

3. The method as claimed in claim 1, wherein the navigation apparatus receives from a database at least one of historical data relating to previous vandalism within a predetermined radius of the parking spot, and future event data relating to imminent events within a predetermined radius of the parking spot.

4. The method as claimed in claim 1, wherein the information device stores the feature data from the parking spot in a database under an identification number for the parking spot.

5. The method as claimed in claim 1, wherein
    the information device stores respective feature data for a plurality of parking spots, and
    the navigation apparatus ascertains for each parking spot a rating of how well suited the parking spot is to parking the second vehicle.

6. The method as claimed in claim 5, wherein
    for each of the parking spots, the feature data comprises a plurality of parameters for the parking spot,
    the navigation apparatus applies a weighting to each parameter, and
    the navigation apparatus combines weighted parameters to ascertain the rating for each parking spot.

7. The method as claimed in claim 5, wherein the rating for each parking spot is ascertained by the navigation apparatus based on at least one of weather data, season, outside temperature and level of equipment of the second vehicle.

8. The method as claimed in claim 5, wherein
    the navigation apparatus displays the rating for each parking spot to the driver of the second vehicle, and
    the navigation apparatus displays the rating using at least one of a navigation system road map and a projection apparatus that projects an image on a windowpane of the second vehicle.

9. The method as claimed in claim 1, wherein
    the navigation apparatus selects a preferred parking spot in a predetermined environment around a navigation destination,
    the preferred parking spot is selected based on the feature data received from the information device, and
    the navigation apparatus ascertains a navigation route to the preferred parking spot.

10. The method as claimed in claim 9, wherein the navigation apparatus receives from the driver of the second vehicle, an input that comprises a minimum requirement criterion that a parking spot needs to satisfy in order to be considered during selection.

11. The method as claimed in claim 1, further comprising:
    selecting a most preferred parking spot; and
    displaying information to the driver of the second vehicle, relating to the most preferred parking spot.

12. The method as claimed in claim 1, wherein the navigation apparatus further receives information regarding at least one of whether the parking spot is lit at night, whether the parking spot is covered, a length of a footpath from the parking spot to a final destination and weather information concerning weather predicted when the driver of the second vehicle wishes to park the second vehicle in the parking spot.

13. The method as claimed in claim 1, further comprising using an infotainment system to display a street map on which potential parking spots are marked together with rating information.

14. The method as claimed in claim 1, further comprising requesting the feature data from the information device after the navigation apparatus receives the time statement from the driver of the second vehicle.

15. The method as claimed in claim 1, wherein
a locating device identifies an unoccupied parking spot, and
a display is produced for the unoccupied parking spots, to provide the driver of the second vehicle with a rating of the unoccupied parking spot.

16. The method as claimed in claim 1, wherein
the method further comprises receiving input data with a rating for a parking spot, the input data being received from a driver of a first vehicle that is parked in the parking spot; and
the feature data further comprises the input data with the rating.

17. A navigation apparatus for a parking motor vehicle, comprising a processor to:
receive feature data pertaining to a plurality of parking spots from an information device, the feature data describing for each parking spot, an environmental influence to which a predecessor vehicle parked in the parking spot was exposed, the environmental influence being at least one of an insolation on the predecessor vehicle and a degree of icing on an exterior surface of the predecessor vehicle, the feature data additionally comprising a time statement concerning when the predecessor vehicle was exposed to the environmental influence;
receive from a driver of the parking motor vehicle an input with data that indicates when the parking motor vehicle will probably be parked in one of the parking spots;
check which feature data are relevant to the driver of the parking motor vehicle, the feature data being checked for relevance to the driver of the parking motor vehicle based on when the driver of the parking motor vehicle wishes to park the parking motor vehicle;
compile significant feature data pertaining to the plurality of parking spots, the significant feature data being compiled using the feature data that are relevant to the driver of the parking motor vehicle; and
produce a display for at least one of the parking spots, the display being of at least one of the feature data for the parking spot and a rating for the parking spot that was derived from the feature data for the parking spot, the display being produced on a windowpane of the parking motor vehicle using a projection apparatus of the parking motor vehicle, wherein
the time statement of the feature data comprises at least one of a season and a time of day.

18. The navigation apparatus as claimed in claim 17, wherein the navigation apparatus is integrated into the parking motor vehicle and connected to an infotainment system of the parking motor vehicle.

19. The navigation apparatus as claimed in claim 17, wherein the display on the windowpane is provided in association with a frame that frames the parking spot.

20. A motor vehicle comprising the navigation apparatus as claimed in claim 17.

21. The motor vehicle as claimed in claim 20, further comprising a capture device to capture feature data for the parking spot after the parking motor vehicle has parked in the parking spot, the feature data comprising an environmental influence to which the parking motor vehicle was exposed while parked in the parking spot.

* * * * *